United States Patent
Andoni et al.

(10) Patent No.: US 10,373,056 B1
(45) Date of Patent: Aug. 6, 2019

(54) UNSUPERVISED MODEL BUILDING FOR CLUSTERING AND ANOMALY DETECTION

(71) Applicant: SparkCognition, Inc., Austin, TX (US)

(72) Inventors: Sari Andoni, Austin, TX (US); Kevin Gullikson, Austin, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 15/880,339

(22) Filed: Jan. 25, 2018

(51) Int. Cl.
*G06N 3/08* (2006.01)
*G06K 9/62* (2006.01)
*G06F 17/18* (2006.01)
*G06N 3/04* (2006.01)

(52) U.S. Cl.
CPC ............. *G06N 3/088* (2013.01); *G06F 17/18* (2013.01); *G06K 9/6218* (2013.01); *G06N 3/0454* (2013.01); *G06N 3/084* (2013.01); *G06N 3/086* (2013.01)

(58) Field of Classification Search
None
See application file for complete search history.

(56) References Cited

U.S. PATENT DOCUMENTS

| 2007/0011114 A1 | 1/2007 | Chen et al. | |
|---|---|---|---|
| 2016/0307305 A1* | 10/2016 | Madabhushi | G06T 11/001 |
| 2017/0004399 A1* | 1/2017 | Kasahara | G06N 3/08 |

OTHER PUBLICATIONS

An, et al., "Variational Autoencoder based Anomaly Detection using Reconstruction Probability," SNU Data Mining Center, Feb. 2015 Special Lecture on IE, Dec. 27, 2015, 18 pgs.

Dilokthanakul, et al., "Deep Unsupervised Clustering with Gaussian Mixture Variational Autoencoders," Department of Computing, Department of Bioengineering, Imperial College London, London, UK, Jan. 13, 2017, pp. 1-12.

Doersch, "Tutorial on Variational Autoencoders," Carnegie Mellon, UC Berkeley, Aug. 16, 2016, pp. 1-23.

Ester, et al., "A Density-Based Algorithm for Discovering Clusters in Large Spatial Databases with Noise," KDD-96 Proceedings, Spatial, Text & Multimedia, 1996, www.aaai.org, pp. 226-231.

Jiang, et al., "Variational Deep Embedding: An Unsupervised and Generative Approach to Clustering," Jun. 29, 2017, <http://ijcai-17.org/accepted-papers.html>, 22 pgs.

(Continued)

*Primary Examiner* — Li Wu Chang
(74) *Attorney, Agent, or Firm* — Toler Law Group, PC

(57) ABSTRACT

During training mode, first input data is provided to a first neural network to generate first output data indicating that the first input data is classified in a first cluster. The first input data includes at least one of a continuous feature or a categorical feature. Second input data is generated and provided to at least one second neural network to generate second output data. The at least one second neural network corresponds to a variational autoencoder. An aggregate loss corresponding to the second output data is determined, including at least one of evaluating a first loss function for the continuous feature or evaluating a second loss function for the categorical feature. Based on the aggregate loss, at least one parameter of at least one neural network is adjusted. During use mode, the neural networks are used to determine cluster identifications and anomaly likelihoods for received data samples.

20 Claims, 7 Drawing Sheets

(56) References Cited

OTHER PUBLICATIONS

Jones, "The Reparameterization 'Trick'," <https://medium.com/@llionj/the-reparameterization-trick-4ff30Fe92954> downloaded Sep. 20, 2017, 7 pgs.
Pitchumani, "A More Effective Approach to Unsupervised Learning with Time Series Data," Sep. 19, 2017, <https://sparkcognition.com/2017/09/more-effective-approach-unsupervised-learning-time-series-data/>, 8 pgs.
Shu, "Gaussian Mixture VAE: Lessons in Variational Inference, Generative Models, and Deep Nets," Dec. 25, 2016, <http://ruishu.io/2016/12/25/gmvae/>, 11 pgs.
Xie, et al., "Unsupervised Deep Embedding for Clustering Analysis," Proceedings of the 33rd International Conference on Machine Learning, New York, NY 2016, 10 pgs.
Altosaar, J., "Tutorial—What is a variational autoencoder?", retrieved from <<https://jaan.io/what-is-variational-autoencoder-vae-tutorial/>>, Dec. 1, 2017, pp. 1-23.
Frans, K., "Variational Autoencoders Explained", retrieved from <<http://kvfrans.com/variational-autoencoders-explained/>>, Aug. 6, 2016, pp. 1-8.

\* cited by examiner

UNSUPERVISED MODEL BUILDING FOR CLUSTERING AND ANOMALY DETECTION

BACKGROUND

Advances in machine learning have enabled computing devices to solve complex problems in many fields. Machine learning is typically classified as supervised or unsupervised. In supervised machine learning, training data includes an indication of the ultimate desired result that a model is being trained to generate. For example, for supervised machine learning of a neural network that determines whether input data indicates a failure condition, the training data would be "labeled," such as by including a column "Failure? (Yes/No)." Thus, use of supervised machine learning places certain conditions on training data.

In contrast, unsupervised machine learning can be performed using unlabeled data. A common benchmark used to compare machine learning algorithms is digit recognition on the MNIST database of handwritten digits. Each training sample in the MNIST database is an image of a handwritten digit (zero to nine). The training images are labeled, but the labels are not used in an unsupervised machine learning scenario. Instead, the unlabeled images are input into an unsupervised machine learning algorithm, such as an autoencoder. Assuming that the images each include P pixels, training the autoencoder "teaches" the autoencoder how to perform two tasks. First, the autoencoder learns how to encode an input image to a specified number of features, such as Q features, where Q is typically less than P. Second, the autoencoder learns how to decode a feature vector of Q features to generate a "reconstructed" image having P pixels. In a perfect reconstruction, decoding the Q features generated by encoding an input image results in a reconstructed image that is identical to that input image. Once training is completed, the autoencoder can encode an input image to generate a compressed representation and then decode the compressed representation to get back the original input image with hopefully minimal error rate.

Autoencoders can be useful to "memorize" data characteristics and to output replicas of input data. However, autoencoders are not generally suitable for generative problems where the output data needs to be sufficiently similar, but not too similar or identical, to input data. For example, consider a video game in which a player races a vehicle through various urban and rural terrain. When automatically generating trees to fill out a forest or when automatically generating pedestrians to populate sidewalks, the player would find it boring if every tree and every pedestrian looked the same. A variational autoencoder (VAE) is one way of solving such generative problems. In a VAE, randomness is introduced during training. The encoder of the VAE produces a mean and a variance (deterministically), which provides a probability distribution in a latent space. During training, that mean and variance is used to randomly sample from a Gaussian distribution to get an encoded vector, which is then (deterministically) decoded. During evaluation (i.e., after training is completed), the VAE is used to either encode data (in which case only mean produced by the encoder is used) or to decode a given vector. Thus, returning to the video game trees example described above, slightly different trees may be generated by randomly sampling different vectors (in the latent space), and providing those vectors to the decoder to decode those vectors into trees. Since the input to the decoder will be slightly different, the output will be slightly different as well.

SUMMARY

There are many different types of machine learning tasks. Clustering is a machine learning task in which a model is trained to accept input data and output an indicator of which of multiple possible clusters the input data belongs to. Handwritten digit recognition on the MNIST database is an example of a clustering task. Anomaly detection is a machine learning task in which a model is trained to accept input data and output an indication of whether the input data corresponds to an unusual condition, i.e., an anomaly. In some examples, an anomaly is identified on the basis of multiple input data items, such as a time-series of data, rather than on the basis of a single input data item. Anomaly detection can be used, for example, to proactively predict that a particular device is likely to fail in the future. To illustrate, an anomaly may be detected because empirically measured time-series data regarding the device is unusual and/or predicted to lead to a failure state. An accurate anomaly detection model can therefore provide significant cost savings in the field, because it is usually easier and cheaper to fix a small defect than replace an entire device after failure (which could involve global/system-wide shutdown).

Clustering and anomaly detection are typically performed by different machine learning models that are trained using different techniques on different training data. In contrast, the present disclosure provides systems and methods of simultaneously training (and after training is completed, using) a computer to perform both clustering as well as anomaly detection based on a single unlabeled training data set. In an illustrative aspect, a variational autoencoder (VAE) is used as part of the described systems and methods. As further described below, in some aspects the described techniques enable a computer to generate additional training data for itself, such as by extending the training data set to include features corresponding to each possible cluster, even when the total number of clusters is not known beforehand.

DETAILED DESCRIPTION

Figure 1A:
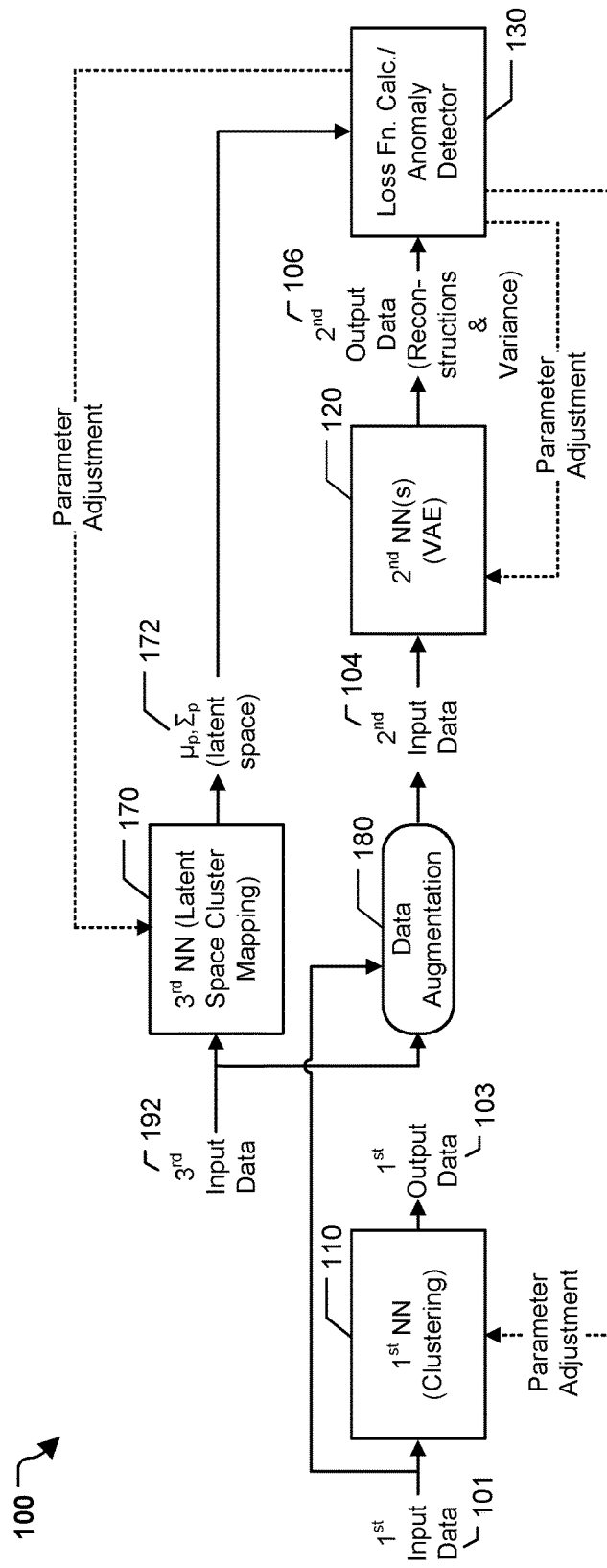
FIGS. 1A, 1B, and 1C illustrate a particular embodiment of a system that is operable to perform unsupervised model building for clustering and anomaly detection.
Figure 1B:
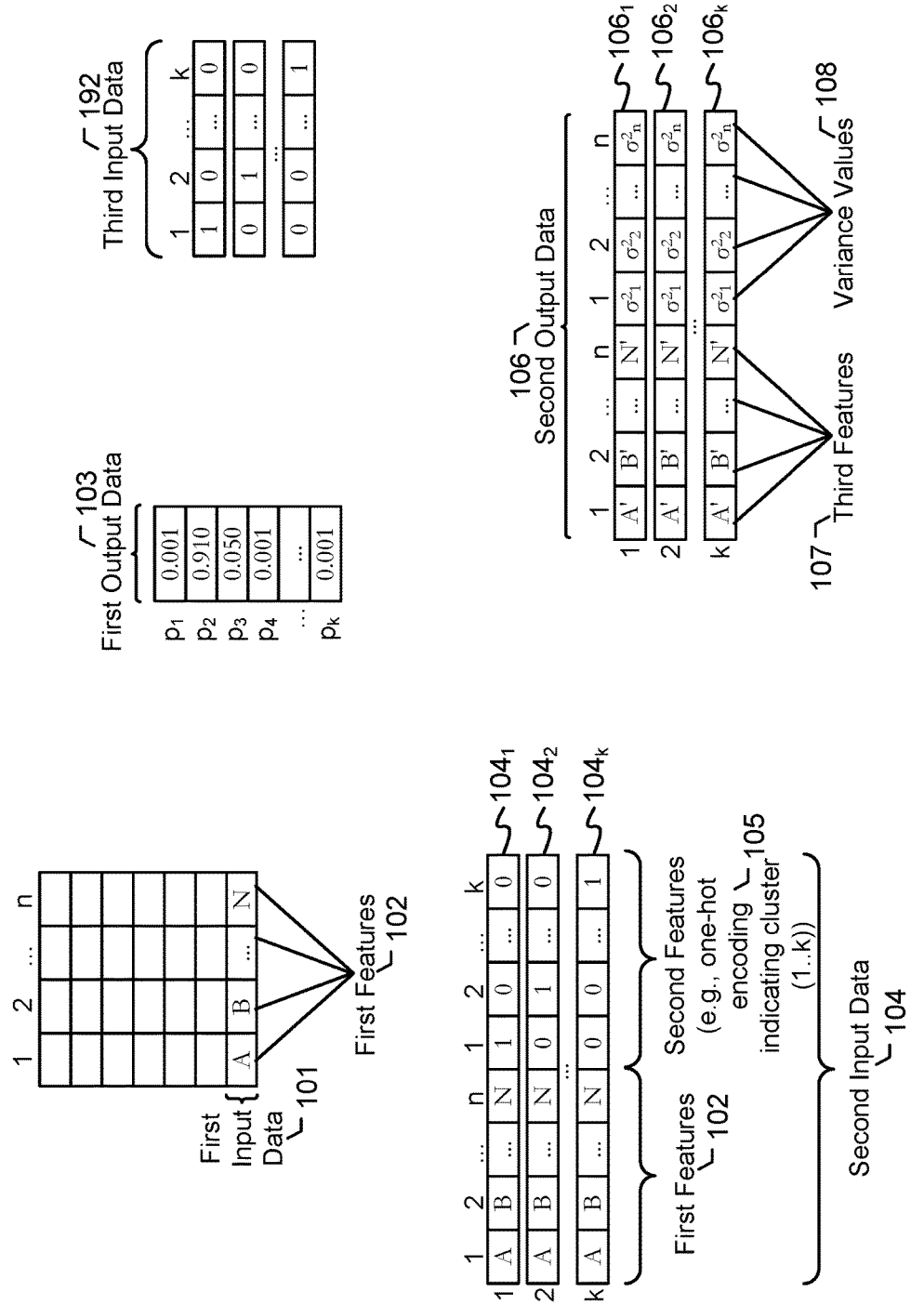
Figure 1C:
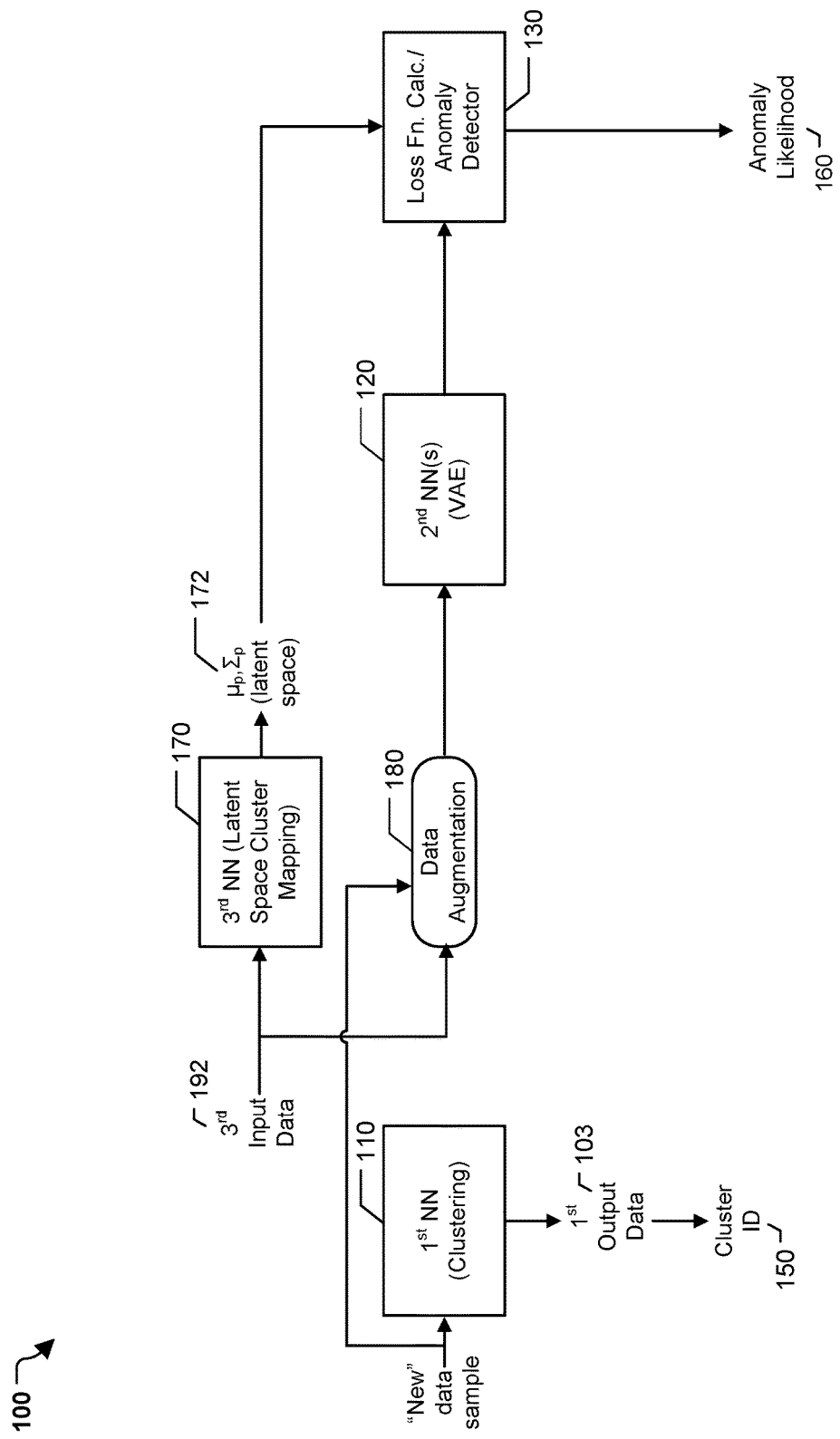

Referring to FIGS. 1A, 1B, and 1C, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a first neural network 110, second neural network(s) 120, a third neural network 170, and a loss function calculator and anomaly detector 130 (hereinafter referred to as "calculator/detector"). As denoted in FIG. 1A and as further described herein, the first neural network 110 may perform clustering, the second neural network(s) 120 may include a variational autoencoder (VAE), and the third neural network 170 may perform a latent space cluster mapping operation.

It is to be understood that operations described herein as being performed by the first neural network 110, the second neural network(s) 120, the third neural network 170, or the calculator/detector 130 may be performed by a device executing software configured to execute the calculator/detector 130 and to train and/or evaluate the neural networks 110, 120, 170. The neural networks 110, 120, 170 may be represented as data structures stored in a memory, where the data structures specify nodes, links, node properties (e.g., activation function), and link properties (e.g., link weight). The neural networks 110, 120, 170 may be trained and/or evaluated on the same or on different devices, processors (e.g., central processor unit (CPU), graphics processing unit (GPU) or other type of processor), processor cores, and/or threads (e.g., hardware or software thread). Moreover, execution of certain operations associated with the first neural network 110, the second neural network(s) 120, the third neural network 170, or the calculator/detector 130 may be parallelized.

The system 100 may generally operate in two modes of operation: training mode and use mode. FIG. 1A corresponds to an example of the training mode and FIG. 1C corresponds to an example of the use mode.

Turning now to FIG. 1A, the first neural network 110 may be trained, in an unsupervised fashion, to perform clustering. For example, the first neural network 110 may receive first input data 101. The first input data 101 may be part of a larger data set and may include first features 102, as shown in FIG. 1B. The first features 102 may include continuous features (e.g., real numbers), categorical features (e.g., enumerated values, true/false values, etc.), and/or time-series data. In a particular aspect, enumerated values with more than two possibilities are converted into binary one-hot encoded data. To illustrate, if the possible values for a variable are "cat," "dog," or "sheep," the variable is converted into a 3-bit value where 100 represents "cat," 010 represents "dog," and 001 represents "sheep." In the illustrated example, the first features include n features having values A, B, C, . . . N, where n is an integer greater than zero.

The first neural network 110 may include an input layer, an output layer, and zero or more hidden layers. The input layer of the first neural network 110 may include n nodes, each of which receives one of the n first features 102 as input. The output layer of the first neural network 110 may include k nodes, where k is an integer greater than zero, and where each of the k nodes represents a unique cluster possibility. In a particular aspect, in response to the first input data 101 being input to the first neural network 110, the neural network 110 generates first output data 103 having k numerical values (one for each of the k output nodes), where each of the numerical values indicates a probability that the first input data 101 is part of (e.g., classified in) a corresponding one of the k clusters, and where the sum of the numerical values is one. In the example of FIG. 1B, the k cluster probabilities in the first output data 103 are denoted $p_1 \ldots p_k$, and the first output data 103 indicates that the first input data 101 is classified into cluster 2 with a probability of ($p_2$=0.91=91%).

A "pseudo-input" may be automatically generated and provided to the third neural network 170. In the example of FIG. 1A, such pseudo-input is denoted as third input data 192. As shown in FIG. 1B, the third input data 192 may correspond to one-hot encoding for each of the k clusters. Thus, the third neural network 170 may receive an identification of cluster(s) as input. The third neural network 170 may map the cluster(s) into region(s) of a latent feature space. For example, the third neural network 170 may output values $\mu_p$ and $\Sigma_p$, as shown at 172, where $\mu_p$ and $\Sigma_p$ represent mean and variance of a distribution (e.g., a Gaussian normal distribution), respectively, and the subscript "p" is used to denote that the values will be used as priors for cluster distance measurement, as further described below. $\mu_p$ and $\Sigma_p$ may be vectors having mean and variance values for each latent space feature, as further explained below. By outputting different values of $\mu_p$ and $\Sigma_p$ for different input cluster identifications, the third neural network 170 may "place" clusters into different parts of latent feature space, where each of those individual clusters follows a distribution (e.g., a Gaussian normal distribution).

In a particular aspect, the second neural network(s) 120 include a variational autoencoder (VAE). The second neural network(s) 120 may receive second input data 104 as input. In a particular aspect, the second input data 104 is generated by a data augmentation process 180 based on a combination of the first input data 101 and the third input data 192. For example, the second input data 104 may include the n first features 102 and may include k second features 105, where the k second features 105 are based on the third input data 192, as shown in FIG. 1B. In the illustrated embodiment, the second features 105 correspond to one-hot encodings for each of the k clusters. That is, the second input data 104 has k entries, denoted $104_1$-$104_k$ in FIG. 1B. Each of the entries $104_1$-$104_k$ includes the same first features 102. For the first entry $104_1$, the second features 105 are "10 . . . 0" (i.e., a one-hot encoding for cluster 1). For the second entry $104_2$, the second features 105 are "01 . . . 0" (i.e., a one-hot encoding for cluster 2). For the kth entry $104_k$, the second features 105 are "00 . . . 1" (i.e., a one-hot encoding cluster k). Thus, the first input data 101 is used to generate k entries in the second input data 104.

The second neural network(s) 120 generates second output data 106 based on the second input data 104. In a particular aspect, the second output data 106 includes k entries $106_1$-$106_k$, each of which is generated based on the corresponding entry $104_1$-$104_k$ of the second input data 104. Each entry of the second output data 106 may include at least third features 107 and variance values 108 for the third features 107. Although not shown in FIG. 1, the VAE may also generate k entries of $\mu_e$ and $\Sigma_e$, which may be used to construct the actual encoding space (often denoted as "z"). As further described below, the $\mu_e$ and $\Sigma_e$ values may be compared to $\mu_p$ and $\Sigma_p$ output from the third neural network 170 during loss function calculation and anomaly detection. Each of the third features is a VAE "reconstruction" of a corresponding one of the first features 102. In the illustrated embodiment, the reconstructions of features A . . . N are represented as A' . . . N' having associated variance values $\sigma^2_1 \ldots \sigma^2_n$.

Figure 2:
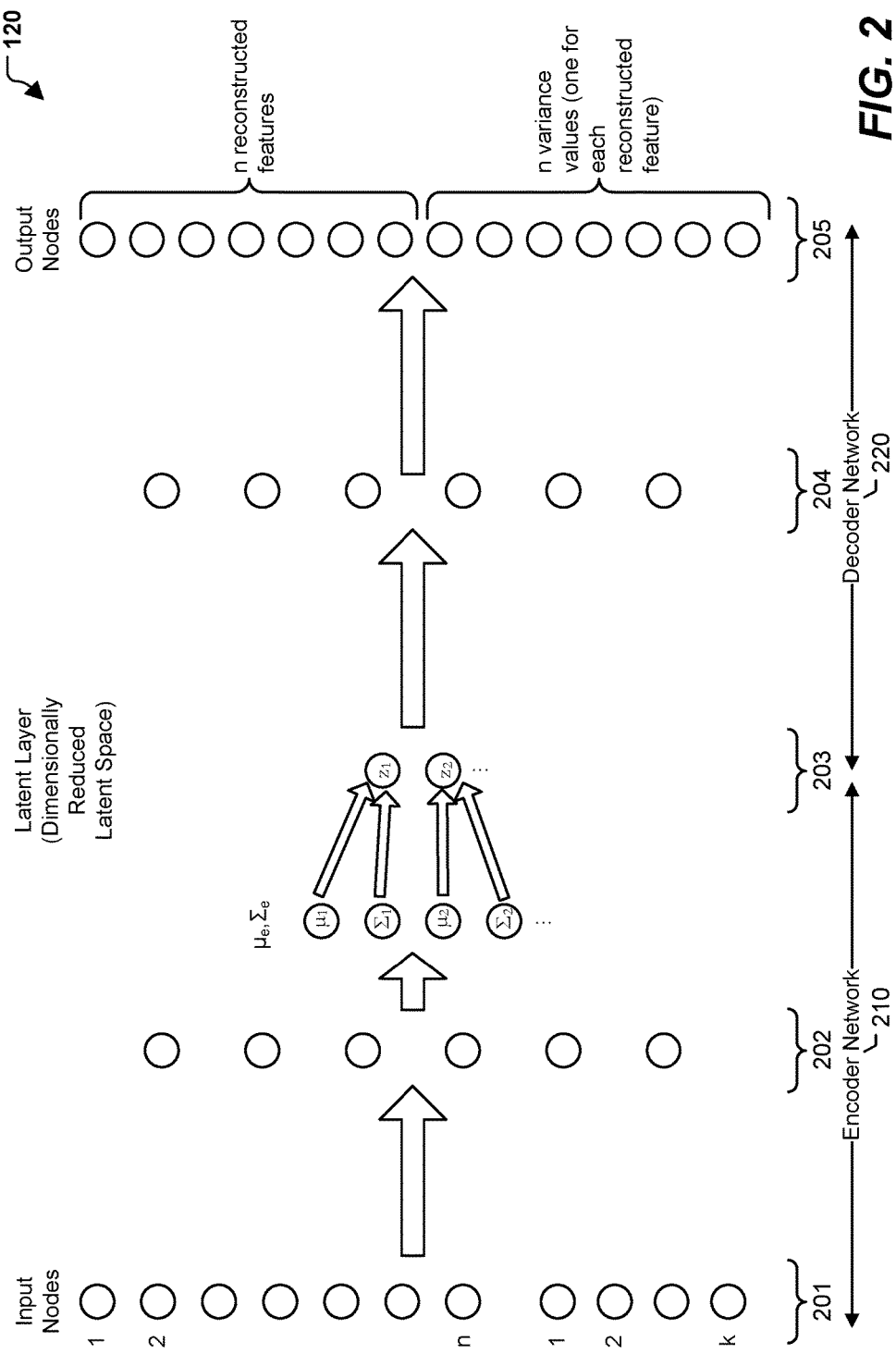
FIG. 2 is a diagram to illustrate a particular embodiment of neural networks that may be included in the system of FIG. 1.

Referring to FIG. 2, the second neural network(s) 120 may include an encoder network 210 and a decoder network 220. The encoder network 210 may include an input layer 201 including an input node for each of the n first features 102 and an input node for each of the k second features 105. The encoder network 210 may also include one or more hidden layers 202 that have progressively fewer nodes. A "latent" layer 203 serves as an output layer of the encoder network 210 and an input layer of the decoder network 220. The latent layer 203 corresponds to a dimensionally reduced latent space. The latent space is said to be "dimensionally reduced" because there are fewer nodes in the latent layer 203 than there are in the input layer 201. The input layer 201 includes (n+k) nodes, and in some aspects the latent layer 203 includes no more than half as many nodes, i.e., no more than (n+k)/2 nodes. By constraining the latent layer 203 to fewer nodes than the input layer, the encoder network 210 is forced to represent input data (e.g., the second input data 104) in "compressed" fashion. Thus, the encoder network 210 is configured to encode data from a feature space to the dimensionally reduced latent space. In a particular aspect, the encoder network 210 generates values $\mu_e$, $\Sigma_e$, which are data vectors having mean and variance values for each of the latent space features. The resulting distribution is sampled to generate the values (denoted "z") in the "latent" layer 203. The "e" subscript is used here to indicate that the values are generated by the encoder network 210 of the VAE. The latent layer 203 may therefore represent cluster identification and latent space location along with the input features in a "compressed" fashion. Because each of the clusters has its own Gaussian distribution, the VAE may considered a Gaussian Mixture Model (GMM) VAE.

The decoder network 220 may approximately reverse the process performed by the encoder network 210 with respect to the n features. Thus, the decoder network 220 may include one or more hidden layers 204 and an output layer 205. The output layer 205 outputs a reconstruction of each of the n input features and a variance ($\sigma^2$) value for each of the reconstructed features. Therefore, the output layer 205 includes n+n=2n nodes.

Returning to FIG. 1A, the calculator/detector 130 calculates a loss (e.g., calculate the value of a loss function) for each entry $106_1$-$106_k$ of the second output data 106, and calculates an aggregate loss based on the per-entry losses. Different loss functions may be used depending on the type of data that is present in the first features 102.

In a particular aspect, the reconstruction loss function $L_{R\_confeature}$ for a continuous feature is represented by Gaussian loss in accordance with Equation 1:

$$L_{R\_confeature} = \ln\left(\frac{1}{\sqrt{2\pi\sigma^2}}e^{-\frac{(x'-x)^2}{2\sigma^2}}\right), \quad \text{Equation 1}$$

where ln is the natural logarithm function, $\sigma^2$ is variance, x' is output/reconstruction value, and x is input value.

To illustrate, if the feature A of FIG. 1B, which corresponds to reconstruction output A' and variance $\sigma^2_1$, is a continuous feature, then its reconstruction loss function $L_R(A)$ is shown by Equation 2:

$$L_{R\_confeature}(A) = \ln\left(\frac{1}{\sqrt{2\pi\sigma_1^2}}e^{-\frac{(A'-A)^2}{2\sigma_1^2}}\right). \quad \text{Equation 2}$$

In a particular aspect, the reconstruction loss function $L_{R\_catfeature}$ for a binary categorical feature is represented by binomial loss in accordance with Equation 3:

$$L_{R\_catfeature} = x_{true} \ln x' + (1-x_{true})\ln(1-x') \quad \text{Equation 3}$$

where ln is the natural logarithm function, $x_{true}$ is one if the value of the feature is true, $x_{true}$ is zero if the value of the feature is false, and x' is the output/reconstruction value (which will be a number between zero and one). It will be appreciated that Equation 3 corresponds to the natural logarithm of the Bernoulli probability of x' given $x_{true}$, which can also be written as $\ln P(x'|x_{true})$.

As an example, if the feature N of FIG. 1B, which corresponds to reconstruction output N', is a categorical feature, then its loss function $L_R(N)$ is shown by Equation 4 (variances may not be computed for categorical features because they are distributed by a binomial distribution rather than a Gaussian distribution):

$$L_{R\_catfeature}(N) = N_{true} \ln N' + (1-N_{true})\ln(l-N') \quad \text{Equation 4}$$

The total reconstruction loss $L_R$ for an entry may be a sum of each of the per-feature losses determined based on Equation 1 for continuous features and based on Equation 3 for categorical features:

$$L_R = \Sigma L_{R\_catfeature} + \Sigma L_{R\_catfeature} \quad \text{Equation 5}$$

It is noted that Equations 1-5 deal with reconstruction loss. However, as the system 100 of FIG. 1 performs combined clustering and anomaly detection, loss function determination for an entry should also consider distance from clusters. In a particular aspect, cluster distance is incorporated into loss calculation using two Kullback-Leibler (KL) divergences.

The first KL divergence, $KL_1$, is represented by Equation 6 below and represents the deviation of $\mu_P$, $\Sigma_P$ from $\mu_e$, $\Sigma_e$:

$$KL_1 = KL(\mu_e,\Sigma_e\|\mu_P,\Sigma_P) \quad \text{Equation 6}$$

where $\mu_e$, $\Sigma_e$ are the clustering parameters generated at the VAE (i.e., the second neural network(s) 120) and $\mu_P$, $\Sigma_P$ are the values shown at 172 being output by the latent space cluster mapping network (i.e., the third neural network 170).

The second KL divergence, $KL_2$, is based on the deviation of a uniform distribution from the cluster probabilities being output by the latent space cluster mapping network (i.e., the third neural network 170). $KL_2$ is represented by Equation 7 below:

$$KL_2 = KL(P\|P_{Uniform}) \quad \text{Equation 7}$$

where P is the cluster probability vector represented by the first output data 103.

The calculator/detector 130 may determine an aggregate loss L for each training sample (e.g., the first input data 101) in accordance with Equation 8 below:

$$L = KL_2 + \sum_k p(k)(L_R(k) + KL_1(k)) \quad \text{Equation 8}$$

where $KL_2$ is from Equation 7, p(k) are the cluster probabilities in the first output data 103 (which are used as weighting factors), $L_R$ is from Equation 5, and $KL_1$ is from Equation 6. It will be appreciated that the aggregate loss L of Equation 8 is a single quantity that is based on both reconstruction loss as well as cluster distance, where the reconstruction loss function differs for different types of data.

The calculator/detector 130 may initiate adjustment at one or more of the first neural network 110, the second neural network(s) 120, or the third neural network 170, based on the aggregate loss L. For example, link weights, bias functions, bias values, etc. may be modified via backpropagation to minimize the aggregate loss L using stochastic gradient descent. In some aspects, the amount of adjustment performed during each iteration of backpropagation is based on learning rate. In one example, the learning rate, lr, is initially based on the following heuristic:

$$lr = 10^{-4} \frac{N_{data}}{N_{params}},$$ Equation 9 where $N_{data}$ is the number of features and $N_{params}$ is the number of parameters being adjusted in the system 100 (e.g., link weights, bias functions, bias values, etc. across the neural networks 110, 120, 170). In some examples, the learning rate, lr, is determined based on Equation 8 but is subjected to floor and ceiling functions so that lr is always between $5 \times 10^{-6}$ and $10^{-3}$.

The calculator/detector 130 may also be configured to output anomaly likelihood 160, as shown in FIG. 1C, which may be output in addition to a cluster identifier (ID) 150 that is based on the first output data 103 generated by the first neural network 110. For example, the cluster ID 150 is an identifier of the cluster having the highest value in the first output data 103. Thus, in the illustrated, example, the cluster ID 150 for the first input data 101 is an identifier of cluster 2. The anomaly likelihood 160 may indicate the likelihood that the first input data 101 corresponds to an anomaly. For example, the anomaly likelihood may be based on how well the second neural network(s) 120 (e.g., the VAE) reconstruct the input data and how similar $\mu_e$, $\Sigma_e$ are to $\mu_p$, $\Sigma_p$. The cluster ID 150 and the anomaly likelihood 160 are further described below.

As described above, the system 100 may generally operate in two modes of operation: training mode and use mode. During operation in the training mode (FIG. 1A), training data is provided to the neural networks 110, 120, 170 to calculate loss and adjust the parameters of the neural networks 110, 120, 170. For example, input data may be separated into a training set (e.g., 90% of the data) and a testing set (e.g., 10% of the data). The training set may be passed through the system 100 of FIG. 1 during a training epoch. The trained system may then be run against the testing set to determine an average loss in the testing set. This process may then be repeated for additional epochs. If the average loss in the testing set starts exhibiting an upward trend, the learning rate (lr) may be decreased. If the average loss in the testing set no longer decreases for a threshold number of epochs (e.g., ten epochs), the training mode may conclude.

After training is completed, the system 100 enters use mode (alternatively referred to as "evaluation mode") (FIG. 1C). While operating in the use mode, the system 100 generates cluster identifiers 150 and anomaly likelihoods 160 for non-training data, such as real-time or near-real-time data that is empirically measured. In FIG. 1C, identification of certain intermediate data structures is omitted for clarity. When a new data sample is received, the system 100 outputs a cluster ID 150 for the new data sample. The cluster ID 150 may be based on a highest value within the cluster probabilities output in the first output data 103 by the first neural network 110. The system 100 also outputs an anomaly likelihood 160 for the new data sample. The anomaly likelihood 160 (alternatively referred to as an "Anomaly-Score") may be determined based on Equation 10:

$$AnomalyScore = L_R(i) \times N(\mu_e | \mu_p, \Sigma_p)$$ Equation 10, where i is the cluster identified by the cluster ID 150, $L_R(i)$ is the reconstruction loss for the ith entry of the second input data (which includes the one-hot encoding for cluster i), and the second term corresponds to the Gaussian probability of $\mu_e$ given $\mu_p$ and $\Sigma_p$. The anomaly likelihood 160 indicates the likelihood that the first input data 101 corresponds to an anomaly. The anomaly likelihood 160 increases in value with reconstruction loss and when the most likely cluster for the new data sample is far away from where the new data sample was expected to be mapped.

The system 100 of FIGS. 1A-1C may thus be trained and then used to concurrently perform both clustering and anomaly detection. Training and using the system 100 may be preferable from a cost and resource-consumption standpoint as compared to using different machine learning models for clustering than for anomaly detection, where the models are trained using different techniques on different training data.

Moreover, it will be appreciated the system 100 may be applied in various technological settings. As a first illustrative non-limiting example, each of multiple machines, industrial equipment, turbines, engines, etc. may have one or more sensors. The sensors may be on-board or may be coupled to or otherwise associated with the machines. Each sensor may provide periodic empirical measurements to a network server. Measurements may include temperature, vibration, sound, movement in one or more dimensions, movement along one or more axes of rotation, etc. When a new data sample (e.g., readings from multiple sensors) is received, the new data sample may be passed through the clustering and anomaly detection system. The cluster ID 150 for the data sample may correspond to a state of operation of the machine. Some cluster IDs often lead to failure and do not otherwise occur, and such cluster IDs may be used as failure prognosticators. The anomaly likelihood 160 may also be used as a failure prognosticator. The cluster ID 150 and/or the anomaly likelihood 160 may be used to trigger operational alarms, notifications to personnel (e.g., e-mail, text message, telephone call, etc.), automatic parts shutdown (and initiation of fault-tolerance or redundancy measures), repair scheduling, etc.

As another example, the system 100 may be used to monitor for rare anomalous occurrences in situations where "normal" operations or behaviors can fall into different categories. To illustrate, the system 100 may be used to monitor for credit card fraud based on real-time or near-real-time observation of credit card transactions. In this example, clusters may represent different types of credit users. For example, a first cluster may represent people who generally use their credit cards a lot and place a large amount of money on the credit card each month, a second cluster may represent people who only use their credit card when they are out of cash, a third cluster may represent people who use their credit card very rarely, a fourth cluster may represent travelers who use their credit card a lot and in various cities/states/countries, etc. In this example, the cluster ID 150 and the anomaly likelihood 160 may be used to trigger account freezes, automated communication to the credit card holder, notifications to credit card/bank personnel, etc. By automatically determining such trained clusters during unsupervised learning (each of which can have its own Gaussian distribution), the combined clustering/anomaly detection system described herein may generate fewer false positives and fewer false negatives then a conventional VAE (which would assume all credit card users should be on a single Gaussian distribution).

In some examples, the system 100 may include a driving feature detector (not shown) that is configured to compare the feature distribution within a particular cluster to the feature distributions of other clusters and of the input data set as a whole. By doing so, the driving feature detector may identify features that most "drive" the classification of a data sample into the particular cluster. Automated alarms/operations may additionally or alternatively be set up based on examining such driving features, which in some cases may lead to faster notification of a possible anomaly than with the system 100 of FIGS. 1A-1C alone.

In particular aspects, topologies of the neural networks 110, 120, 170 may be determined prior to training the neural networks 110, 120, 170. In a first example, a neural network topology is determined based on performing principal component analysis (PCA) on an input data set. To illustrate, the PCA may indicate that although the input data set includes X features, the data can be represented with sufficient reconstructability using Y features, where X and Y are integers and Y is generally less than or equal to X/2. It will be appreciated that in this example, Y may be the number of nodes present in the latent layer 203. After determining Y, the number of hidden layers 202, 204 and the number of nodes in the hidden layers 202, 204 may be determined. For example, each of the hidden layers may progressively halve the number of nodes from X to Y.

As another example, the topology of a neural network may be determined heuristically, such as based on an upper bound. For example, the topology of the first neural network 110 may be determined by setting the value of k to an arbitrarily high number (e.g., 20, 50, 100, 500, or some other value). This value corresponds to the number of nodes in the output layer of the first neural network 110, and the number of nodes in the input layer of the first neural network 110 may be set to be the n, i.e., the number of first features 102 (though in a different example, the number of input nodes may be less than n and may be determined using a feature selection heuristic/algorithm). Once the number of input and output nodes are determined for the first neural network 110, the number of hidden layers and number of nodes in each hidden layer may be determined (e.g., heuristically).

As yet another example, a combination of PCA and hierarchical density-based spatial clustering of applications with noise (HDBSCAN) may be used to determine neural network topologies. As an illustrative non-limiting example, the input feature set may include one hundred features (i.e., n=100) and performing the PCA results in a determination that a subset of fifteen specific features (i.e., p=15) is sufficient to represent the data while maintaining at least a threshold variance (e.g., 90%). Running a HDBSCAN algorithm on the fifteen principal components results in a determination that there are eight clusters in the PCA data set. The number of clusters identified by the HDBSCAN algorithm may be adjusted by a programmable constant, such as +2, to determine a value of k. In this example, k=8+2=10. The number of input features (n=100), the number of clusters from HDBSCAN (k=10) and the number of principal components (p=15) may be used to determine neural network topologies (below, a hidden layer is assumed to have twice as many nodes as the layer it outputs to).

TABLE 1

| VAE | Input Layer = n input features + k clusters (one-hot encoding) = 110 nodes<br>Encoder Hidden Layer 2 = 60 nodes<br>Encoder Hidden Layer 1 = 30 nodes |
|---|---|

TABLE 1-continued

| | Latent Layer = p principal components = 15 nodes each for $\mu_e$ and $\Sigma_e$<br>Decoder Hidden Layer 1 = 30 nodes<br>Decoder Hidden Layer 2 = 60 nodes<br>Output Layer = n reconstructed features + n variance values = 200 nodes |
|---|---|

TABLE 2

| Clustering Network | Input Layer = n input features = 100 nodes<br>Hidden Layer 1 = 60 nodes<br>Hidden Layer 2 = 30 nodes<br>Output Layer = k possible clusters = 10 nodes |
|---|---|

TABLE 3

| Latent Space Cluster Mapping Network | Input Layer = k possible clusters = 10 nodes<br>Output Layer = p values for $\mu_p$ + p values for $\Sigma_p$ = 30 nodes |
|---|---|

In a particular example, the hidden layer topology of the clustering network and the encoder network of the VAE may be the same. To illustrate, the VAE may have the topology shown in Table 1 above and the clustering network may have the topology shown in Table 4 below.

TABLE 4

| Clustering Network | Input Layer = n input features = 100 nodes<br>Hidden Layer 2 = 60 nodes<br>Hidden Layer 1 = 30 nodes<br>Output Layer = k possible clusters = 10 nodes |
|---|---|

Figure 3:
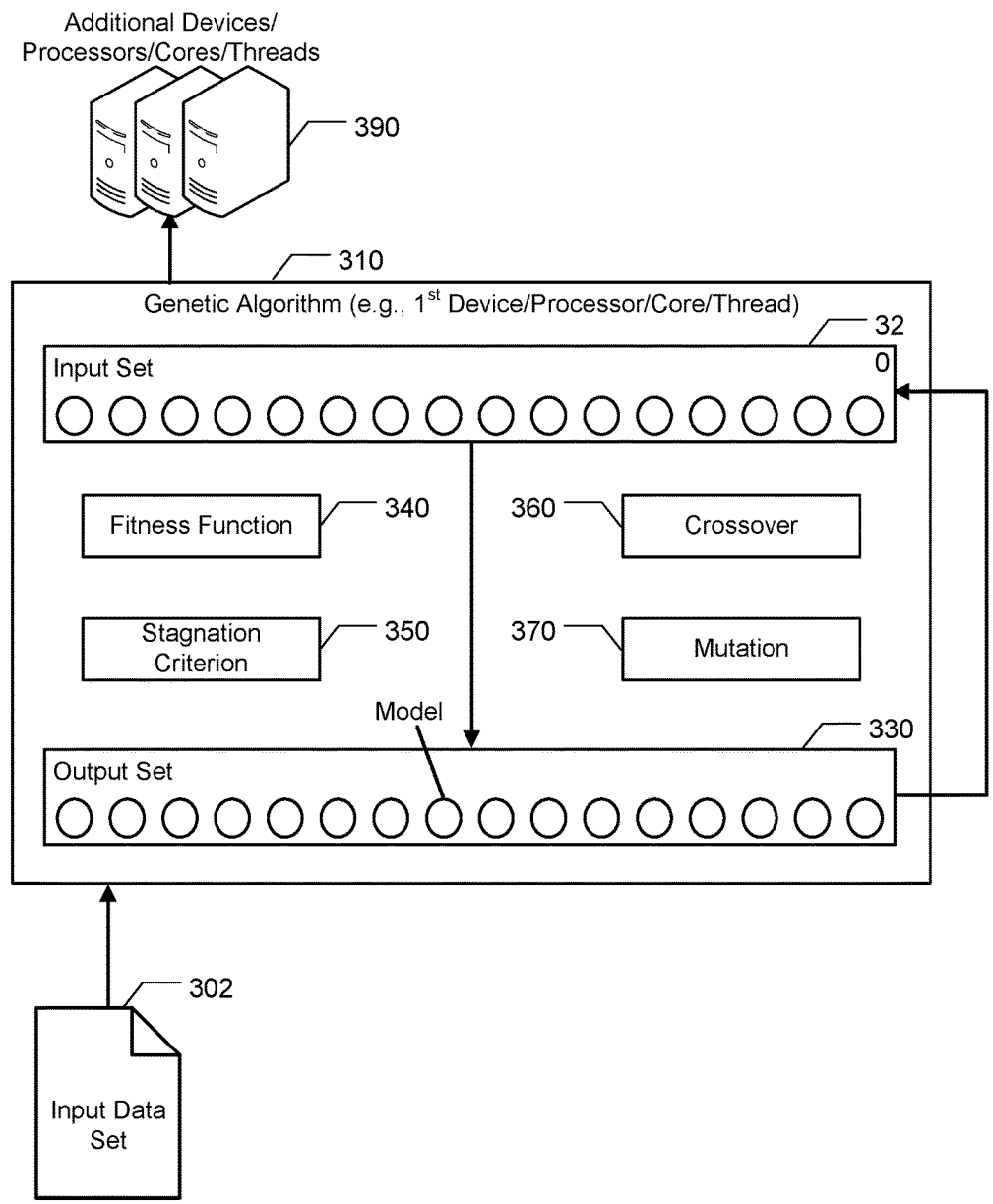
FIG. 3 is a diagram to illustrate a particular embodiment of a system that is operable to determine a topology of a neural network, such as a neural network of FIGS. 1A-1C or FIG. 2, based on execution of a genetic algorithm.

Alternatively, or in addition, referring to FIG. 3, a neural network topology may be "evolved" using a genetic algorithm 310. The genetic algorithm 310 automatically generates a neural network based on a particular data set, such as an illustrative input data set 302, and based on a recursive neuroevolutionary search process. In an illustrative example, the input data set 302 is the input data set shown in FIG. 1, which includes the first input data 101. During each iteration of the search process (also called an "epoch" or "generation" of the genetic algorithm 310), an input set (or population) 320 is "evolved" to generate an output set (or population) 330. Each member of the input set 320 and the output set 330 is a model (e.g., a data structure) that represents a neural network. Thus, neural network topologies can be evolved using the genetic algorithm 310. The input set 320 of an initial epoch of the genetic algorithm 310 may be randomly or pseudo-randomly generated. After that, the output set 330 of one epoch may be the input set 320 of the next (non-initial) epoch, as further described herein.

The input set 320 and the output set 330 each includes a plurality of models, where each model includes data representative of a neural network. For example, each model may specify a neural network by at least a neural network topology, a series of activation functions, and connection weights. The topology of a neural network includes a configuration of nodes of the neural network and connections between such nodes. The models may also be specified to include other parameters, including but not limited to bias values/functions and aggregation functions.

In some examples, a model of a neural network is a data structure that includes node data and connection data. The node data for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or another type of mathematical function that represents a threshold at which the node is activated. The biological analog to activation of a node is the firing of a neuron. The aggregation function is a mathematical function that combines (e.g., sum, product, etc.) input signals to the node. An output of the aggregation function may be used as input to the activation function. The bias is a constant value or function that is used by the aggregation function and/or the activation function to make the node more or less likely to be activated. The connection data for each connection in a neural network includes at least one of a node pair or a connection weight. For example, if a neural network includes a connection from node N1 to node N2, then the connection data for that connection may include the node pair <N1, N2>. The connection weight is a numerical quantity that influences if and/or how the output of N1 is modified before being input at N2. In the example of a recurrent neural network, a node may have a connection to itself (e.g., the connection data may include the node pair <N1, N1>).

The genetic algorithm 310 includes or is otherwise associated with a fitness function 340, a stagnation criterion 350, a crossover operation 360, and a mutation operation 370. The fitness function 340 is an objective function that can be used to compare the models of the input set 320. In some examples, the fitness function 340 is based on a frequency and/or magnitude of errors produced by testing a model on the input data set 302. As a simple example, assume the input data set 302 includes ten rows, that the input data set 302 includes two columns denoted A and B, and that the models illustrated in FIG. 3 represent neural networks that output a predicted value of B given an input value of A. In this example, testing a model may include inputting each of the ten values of A from the input data set 302, comparing the predicted values of B to the corresponding actual values of B from the input data set 302, and determining if and/or by how much the two predicted and actual values of B differ. To illustrate, if a particular neural network correctly predicted the value of B for nine of the ten rows, then the a relatively simple fitness function 340 may assign the corresponding model a fitness value of $9/10=0.9$. It is to be understood that the previous example is for illustration only and is not to be considered limiting. In some aspects, the fitness function 340 may be based on factors unrelated to error frequency or error rate, such as number of input nodes, node layers, hidden layers, connections, computational complexity, etc.

In a particular aspect, fitness evaluation of models may be performed in parallel. To illustrate, the illustrated system may include additional devices, processors, cores, and/or threads 390 to those that execute the genetic algorithm 310. These additional devices, processors, cores, and/or threads 390 may test model fitness in parallel based on the input data set 302 and may provide the resulting fitness values to the genetic algorithm 310.

In a particular aspect, the genetic algorithm 310 may be configured to perform speciation. For example, the genetic algorithm 310 may be configured to cluster the models of the input set 320 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 310 may be configured to serialize a model into a string, such as a normalized vector. In this example, the genetic distance between models may be represented by a binned hamming distance between the normalized vectors, where each bin represents a subrange of possible values.

Because the genetic algorithm 310 is configured to mimic biological evolution and principles of natural selection, it may be possible for a species of models to become "extinct." The stagnation criterion 350 may be used to determine when a species should become extinct, as further described below. The crossover operation 360 and the mutation operation 370 may be highly stochastic under certain constraints and a defined set of probabilities optimized for model building, which may produce reproduction operations that can be used to generate the output set 330, or at least a portion thereof, from the input set 320. Crossover and mutation are further described below.

Operation of the illustrated system is now described. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 302 or data sources from which the input data set 302 is determined. The user may also specify a goal for the genetic algorithm 310. For example, if the genetic algorithm 310 is being used to determine a topology of the first neural network 110, the user may provide the value of k, which represents the total number of possible clusters. The system may then constrain models processed by the genetic algorithm to those that include k output nodes. Alternatively, or in addition, the user may provide input indicating whether all of the features in the input data set 302 (e.g., the first features 102) are to be used by the genetic algorithm 310 or only a subset are to be used, and this impacts the number of input nodes in the models.

In some examples, the genetic algorithm 310 is permitted to generate and evolve models having different numbers of output nodes and input nodes. The models may be tested to determine whether their topologies are conducive to clustering the input data set 302 (e.g., whether the resulting clusters are sufficiently dense, separable, etc.). In a particular aspect, a fitness function may be based on the loss function described with reference to FIG. 1. For example, for a given latent space size, the loss function can be used as the fitness function and the genetic algorithm 310 may be used to determine hidden layer topologies. Alternatively, the loss function may be supplemented to include a penalty that encourages small latent sizes, and the genetic algorithm 310 may be used to determine the latent space size as well.

Thus, in particular implementations, the user can configure various aspects of the models that are to be generated/evolved by the genetic algorithm 310. Configuration input may indicate a particular data field of the data set that is to be included in the model or a particular data field of the data set that is to be omitted from the model, may constrain allowed model topologies (e.g., to include no more than a specified number of input nodes output nodes, no more than a specified number of hidden layers, no recurrent loops, etc.).

Further, in particular implementations, the user can configure aspects of the genetic algorithm 310, such as via input to graphical user interfaces (GUIs). For example, the user may provide input to limit a number of epochs that will be executed by the genetic algorithm 310. Alternatively, the user may specify a time limit indicating an amount of time that the genetic algorithm 310 has to execute before outputting a final output model, and the genetic algorithm 310 may determine a number of epochs that will be executed based on the specified time limit. To illustrate, an initial epoch of the genetic algorithm 310 may be timed (e.g., using a hardware or software timer at the computing device executing the genetic algorithm 310), and a total number of epochs that are to be executed within the specified time limit may be determined accordingly. As another example, the user may constrain a number of models evaluated in each epoch, for example by constraining the size of the input set 320 and/or the output set 330.

After configuration operations are performed, the genetic algorithm 310 may begin execution based on the input data set 302. Parameters of the genetic algorithm 310 may include but are not limited to, mutation parameter(s), a maximum number of epochs the genetic algorithm 310 will be executed, a threshold fitness value that results in termination of the genetic algorithm 310 even if the maximum number of generations has not been reached, whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 310 may utilize a single mutation parameter or set of mutation parameters for all models. In such examples, the mutation parameter may impact how often, how much, and/or what types of mutations can happen to any model of the genetic algorithm 310. In alternative examples, the genetic algorithm 310 maintains multiple mutation parameters or sets of mutation parameters, such as for individual or groups of models or species. In particular aspects, the mutation parameter(s) affect crossover and/or mutation operations, which are further described herein.

The genetic algorithm 310 may automatically generate an initial set of models based on the input data set 302 and configuration input. Each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes. In some aspects, layers nodes may be used instead of or in addition to single nodes. Examples of layer types include long short-term memory (LSTM) layers, gated recurrent units (GRU) layers, fully connected layers, and convolutional neural network (CNN) layers. In such examples, layer parameters may be involved instead of or in addition to node parameters. In some cases, certain layer/node types may be excluded. For example, recurrent and convolutional nodes/layers may be excluded to avoid complicating the loss function.

The initial set of models may be input into an initial epoch of the genetic algorithm 310 as the input set 320, and at the end of the initial epoch, the output set 330 generated during the initial epoch may become the input set 320 of the next epoch of the genetic algorithm 310. In some examples, the input set 320 may have a specific number of models.

For the initial epoch of the genetic algorithm 310, the topologies of the models in the input set 320 may be randomly or pseudo-randomly generated within constraints specified by any previously input configuration settings. Accordingly, the input set 320 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes.

The genetic algorithm 310 may automatically assign an activation function, an aggregation function, a bias, connection weights, etc. to each model of the input set 320 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 320 of the initial epoch. Thus, the models of the input set 320 of the initial epoch may have different topologies (which may include different input nodes corresponding to different input data fields if the data set includes many data fields) and different connection weights. Further, the models of the input set 320 of the initial epoch may include nodes having different activation functions, aggregation functions, and/or bias values/functions.

Each model of the input set 320 may be tested based on the input data set 302 to determine model fitness. For example, the input data set 302 may be provided as input data to each model, which processes the input data set (according to the network topology, connection weights, activation function, etc., of the respective model) to generate output data. The output data of each model may be evaluated using the fitness function 340 to determine how well the model modeled the input data set 302 (i.e., how conducive each model is to clustering the input data). In some examples, fitness of a model based at least in part on reliability of the model, performance of the model, complexity (or sparsity) of the model, size of the latent space, or a combination thereof.

In some examples, the genetic algorithm 310 may employ speciation. In a particular aspect, a species ID of each of the models may be set to a value corresponding to the species that the model has been clustered into. Next, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 310 may maintain a data structure that tracks the fitness of each species across multiple epochs. Based on the species fitness, the genetic algorithm 310 may identify the "fittest" species, which may also be referred to as "elite species." Different numbers of elite species may be identified in different embodiments.

In a particular aspect, the genetic algorithm 310 uses species fitness to determine if a species has become stagnant and is therefore to become extinct. As an illustrative non-limiting example, the stagnation criterion 350 may indicate that a species has become stagnant if the fitness of that species remains within a particular range (e.g., +/−5%) for a particular number (e.g., 5) epochs. If a species satisfies a stagnation criterion, the species and all underlying models may be removed from the genetic algorithm 310.

The fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 330 of the epoch may be generated. In the illustrated example, the output set 330 includes the same number of models as the input set 320. The output set 330 may include each of the "overall elite" models and each of the "elite member" models. Propagating the "overall elite" and "elite member" models to the next epoch may preserve the "genetic traits" resulted in caused such models being assigned high fitness values.

The rest of the output set 330 may be filled out by random reproduction using the crossover operation 360 and/or the mutation operation 370. After the output set 330 is generated, the output set 330 may be provided as the input set 320 for the next epoch of the genetic algorithm 310.

During a crossover operation 360, a portion of one model is combined with a portion of another model, where the size of the respective portions may or may not be equal. When normalized vectors are used to represent neural networks, the crossover operation may include concatenating bits/bytes/fields 0 to p of one normalized vector with bits/bytes/fields p+1 to q of another normalized vectors, where p and q are integers and p+q is equal to the size of the normalized vectors. When decoded, the resulting normalized vector after the crossover operation produces a neural network that differs from each of its "parent" neural networks in terms of topology, activation function, aggregation function, bias value/function, link weight, or any combination thereof.

Thus, the crossover operation may be a random or pseudo-random operator that generates a model of the output set 330 by combining aspects of a first model of the input set 320 with aspects of one or more other models of the input set 320. For example, the crossover operation may retain a topology of hidden nodes of a first model of the input set 320 but connect input nodes of a second model of the input set to the hidden nodes. As another example, the crossover operation may retain the topology of the first model of the input set 320 but use one or more activation functions of the second model of the input set 320. In some aspects, rather than operating on models of the input set 320, the crossover operation may be performed on a model (or models) generated by mutation of one or more models of the input set 320. For example, the mutation operation may be performed on a first model of the input set 320 to generate an intermediate model and the crossover operation may be performed to combine aspects of the intermediate model with aspects of a second model of the input set 320 to generate a model of the output set 330.

During the mutation operation 370, a portion of a model is randomly modified. The frequency, extent, and/or type of mutations may be based on the mutation parameter(s) described above, which may be user-defined or randomly selected/adjusted. When normalized vector representations are used, the mutation operation may include randomly modifying the value of one or more bits/bytes/portions in a normalized vector.

The mutation operation may thus be a random or pseudo-random operator that generates or contributes to a model of the output set 330 by mutating any aspect of a model of the input set 320. For example, the mutation operation may cause the topology of a particular model of the input set to be modified by addition or omission of one or more input nodes, by addition or omission of one or more connections, by addition or omission of one or more hidden nodes, or a combination thereof. As another example, the mutation operation may cause one or more activation functions, aggregation functions, bias values/functions, and/or or connection weights to be modified. In some aspects, rather than operating on a model of the input set, the mutation operation may be performed on a model generated by the crossover operation. For example, the crossover operation may combine aspects of two models of the input set 320 to generate an intermediate model and the mutation operation may be performed on the intermediate model to generate a model of the output set 330.

The genetic algorithm 310 may continue in the manner described above through multiple epochs until a specified termination criterion, such as a time limit, a number of epochs, or a threshold fitness value (e.g., of an overall fittest model), is satisfied. When the termination criterion is satisfied, an overall fittest model of the last executed epoch may be selected and output as reflecting the topology of one of the neural networks in the system 100 of FIG. 1. The aforementioned genetic algorithm-based procedure may be used to determine the topology of zero, one, or more than one neural network in the system 100 of FIG. 1.

Figure 4:
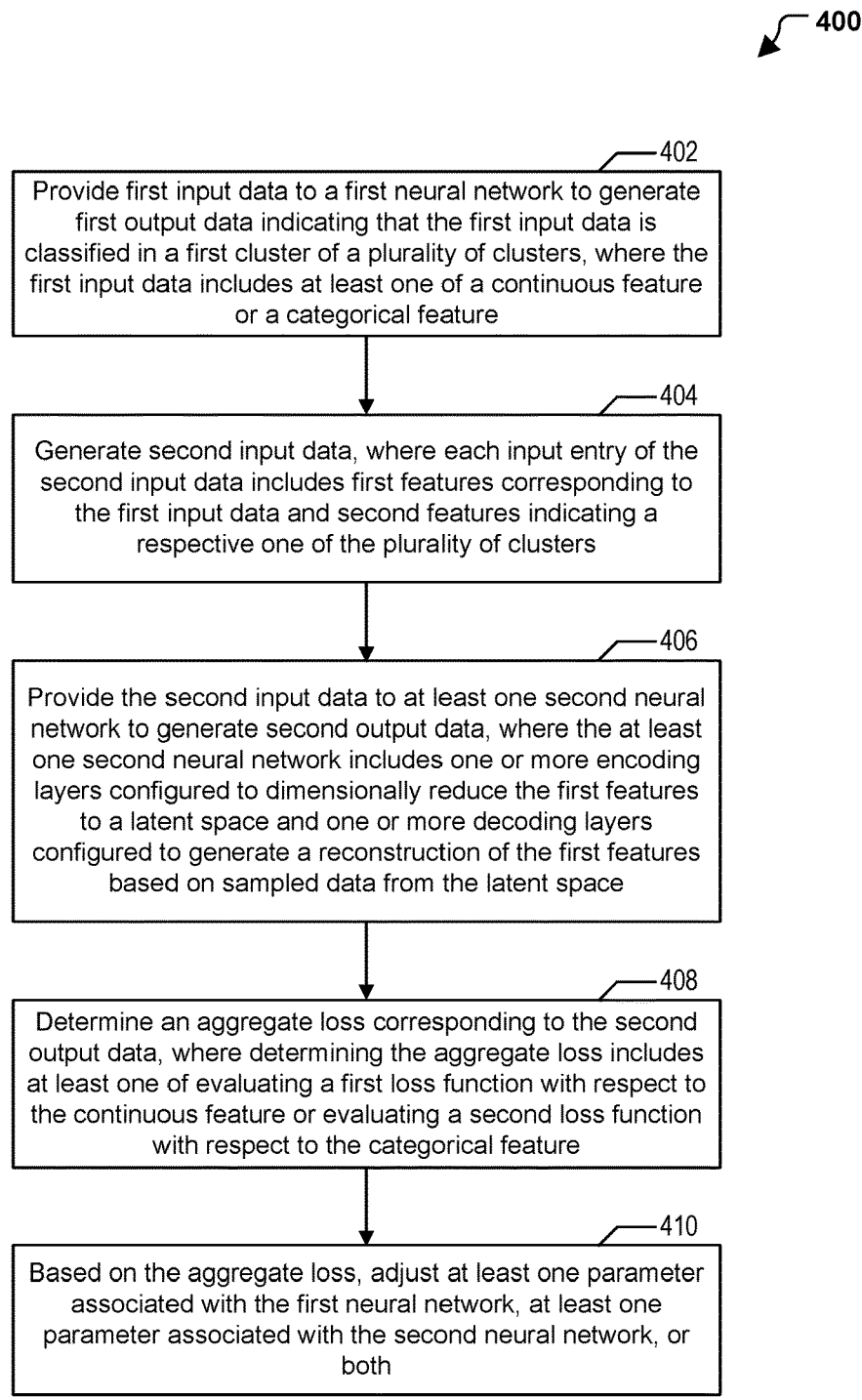
FIG. 4 is a flowchart to illustrate a particular embodiment of a method of operation at the system of FIG. 1 in training mode.

Referring to FIG. 4, a particular example of a method 400 of operation of the system 100 in training mode is shown. The method 400 may include providing first input data to a first neural network to generate first output data, at 402. The first output data indicates that the first input data is classified in a first cluster of a plurality of clusters, where the first input data includes at least one of a continuous feature or a categorical feature. For example, referring to FIG. 1A, the first input data 101 may be provided to the first neural network 110 to generate the first output data 103.

The method 400 may also include generating second input data, at 404. Each input entry of the second input data includes first features corresponding to the first input data and second features indicating a respective one of the plurality of clusters. For example, referring to FIG. 1A and FIG. 1B, the second input data 104 may be generated based on the first input data 101, where the second input data 104 includes the first features 102 and the second features 105.

The method 400 may further include providing the second input data to at least one second neural network to generate second output data, at 406. The at least one second neural network includes one or more encoding layers configured to dimensionally reduce the first features to a latent space and one or more decoding layers configured to generate a reconstruction of the first features based on sampled data from the latent space. For example, referring to FIG. 1A and FIG. 2, the second input data 104 may be provided to the second neural network(s) 120, which may include layer(s) of the encoder network 210 and layer(s) of the decoder network 220.

The method 400 may include determining an aggregate loss corresponding to the second output data, at 408, where determining the aggregate loss includes at least one of evaluating a first loss function with respect to the continuous feature or evaluating a second loss function with respect to categorical feature. For example, referring to FIG. 1A, the calculator/detector 130 may determine an aggregate loss L as described with reference to Equation 8. The loss function for continuous features (e.g., Equation 1) may be different from the loss function for categorical features (e.g., Equation 3).

The method 400 may also include, based on the aggregate loss, adjusting at least one parameter associated with the first neural network, at least one parameter associated with the second neural network, or both, at 410. For example, referring to FIG. 1A, parameter adjustment maybe performed at the neural networks 110, 120.

Figure 5:
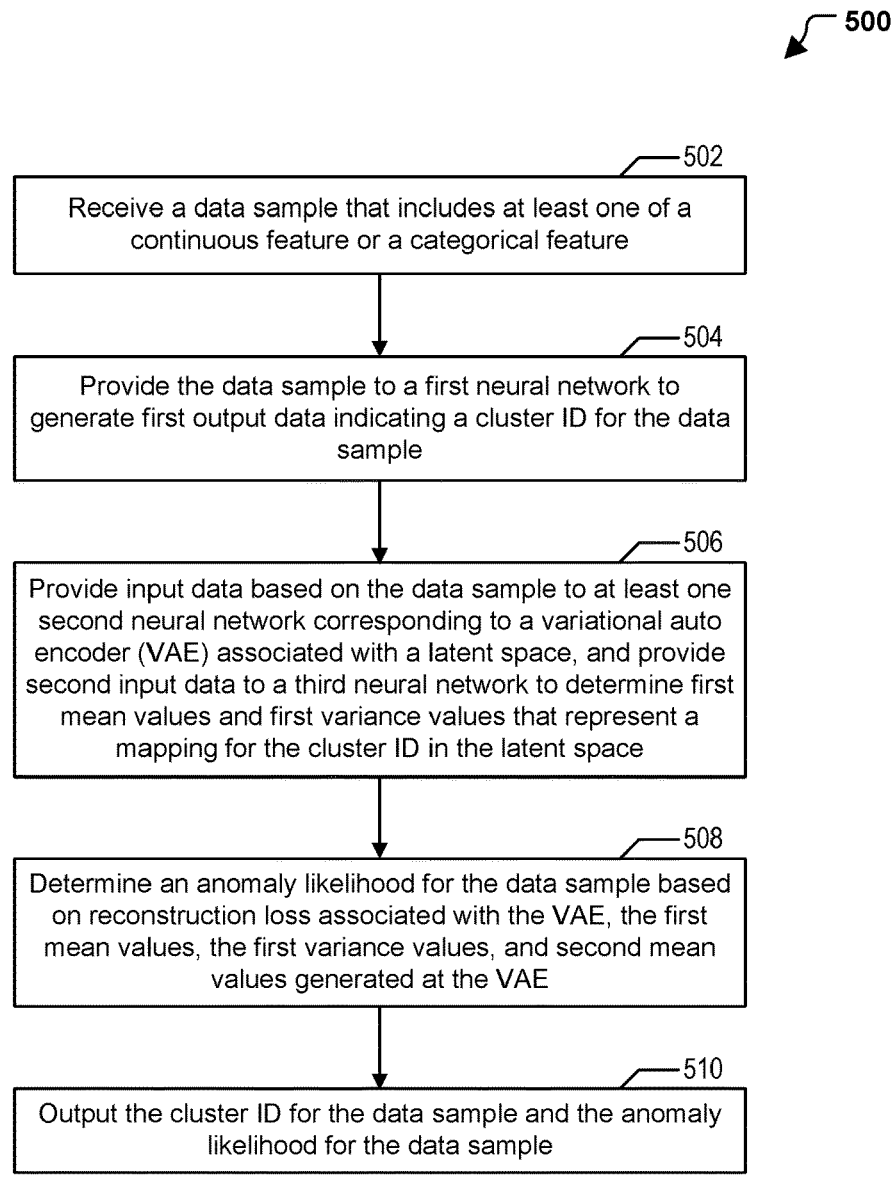
FIG. 5 is a flowchart to illustrate a particular embodiment of a method of operation at the system of FIG. 1 in use mode.

Referring to FIG. 5, a particular example of a method 500 of operation of the system 100 in use mode is shown. The method 500 may include receiving a data sample that includes at least one of a continuous feature or a categorical feature, at 502. For example, referring to FIG. 1C, a "new" data sample may be received at the system 100 while the system 100 is in use mode.

The method 500 may also include providing the data sample to a first neural network to generate first output data indicating a cluster ID for the data sample, at 504. For example, referring to FIG. 1C, the data sample may be provided to the first neural network 110 to generate first output data indicating the cluster ID 150.

The method 500 may further include providing input data based on the data sample to at least one second neural network, and providing third input data to a third neural network, at 506. The at least one second neural network corresponds a VAE associated with a latent space, and the third neural network determines first mean values ($\mu_p$) and first variance values ($\Sigma_p$) that represent a mapping for the cluster ID in the latent space, at 506. For example, referring to FIG. 1A-C, the second neural network(s) 120 may be provided with the second input data 104 and the third neural network 170 may be provided the third input data 192. The third neural network 170 may generate $\mu_p$ and $\Sigma_p$, as shown at 172.

The method 500 may include determining an anomaly likelihood for the data sample based on reconstruction loss associated with the VAE, the first mean values, the first variance values, and second mean values generated at the VAE, at 508. For example, referring to FIG. 1C, the calculator/detector 130 may determine the anomaly likelihood 160 based on Equation 10. It will be appreciated that training time for the disclosed system may be shorter than training time if separate clustering and anomaly detection models were used. Further, as described above, the combination of clustering and anomaly detection, including providing (one-hot) clustering input to a VAE along with input data features, may result in fewer false positive and false negative identifications of anomalies.

The method 500 may include outputting the cluster ID for the data sample and the anomaly likelihood for the data sample, at 510. For example, referring to FIG. 1C, the cluster ID 150 and the anomaly likelihood 160 may be output. In illustrative aspects, one or more operations may automatically be performed and one or notifications may automatically be generated based on the cluster ID 150, the anomaly likelihood 160, or both.

It is to be understood that the division and ordering of steps described herein shown in the flowcharts of FIGS. 4-5 is for illustrative purposes only and is not be considered limiting. In alternative implementations, certain steps may be combined and other steps may be subdivided into multiple steps. Moreover, the ordering of steps may change.

In conjunction with the described aspects, an apparatus includes a processor and a memory storing instructions executable by the processor to perform operations including providing first input data to a first neural network to generate first output data indicating that the first input data is classified in a first cluster of a plurality of clusters, where the first input data includes at least one of a continuous feature or a categorical feature. The operations also include generating second input data, each input entry of the second input data including first features corresponding to the first input data and second features indicating a respective one of the plurality of clusters. The operations further include providing the second input data to at least one second neural network to generate second output data, where the at least one second neural network includes one or more encoding layers configured to dimensionally reduce the first features to a latent space and one or more decoding layers configured to generate a reconstruction of the first features based on sampled data from the latent space. The operations include determining an aggregate loss corresponding to the second output data, where determining the aggregate loss comprises at least one of evaluating a first loss function with respect to the continuous feature or evaluating a second loss function with respect to the categorical feature. The operations also include based on the aggregate loss, adjusting at least one parameter associated with the first neural network, at least one parameter associated with the second neural network, or both.

In conjunction with the described aspects, a method includes providing, by a processor of a computing device, first input data to a first neural network to generate first output data indicating that the first input data is classified in a first cluster of a plurality of clusters, where the first input data includes at least one of a continuous feature or a categorical feature. The method also includes generating second input data, each input entry of the second input data including first features corresponding to the first input data and second features indicating a respective one of the plurality of clusters. The method further includes providing the second input data to at least one second neural network to generate second output data, where the at least one second neural network includes one or more encoding layers configured to dimensionally reduce the first features to a latent space and one or more decoding layers configured to generate a reconstruction of the first features based on sampled data from the latent space. The method includes determining an aggregate loss corresponding to the second output data, where determining the aggregate loss comprises at least one of evaluating a first loss function with respect to the continuous feature or evaluating a second loss function with respect to the categorical feature. The method also includes based on the aggregate loss, adjusting at least one parameter associated with the first neural network, at least one parameter associated with the second neural network, or both.

In conjunction with the described aspects, a computer-readable storage device stores instructions that, when executed, cause a computer to perform operations including receiving a data sample that includes at least one of a continuous feature or a categorical feature. The operations also include providing the data sample to a first neural network to generate first output data indicating a cluster identifier (ID) for the data sample. The operations further include providing input data based on the data sample to at least one second neural network corresponding to a variational auto encoder (VAE) associated with a latent space. The operations include providing third input data to a third neural network to determine first mean values and first variance values that represent a mapping for the cluster ID in the latent space. The operations also include determining an anomaly likelihood for the data sample based on reconstruction loss associated with the VAE, the first mean values, the first variance values, and second mean values generated at the VAE. The operations include outputting the cluster ID for the data sample and the anomaly likelihood for the data sample.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, also not shown in FIG. 1, the system 100 may be implemented using one or more computer hardware devices (which may be communicably coupled via local and/or wide-area networks) that include one or more processors, where the processor(s) execute software instructions corresponding to the various components of FIG. 1. Alternatively, one or more of the components of FIG. 1 may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating multiple neural networks that are configured to perform anomaly detection, the method comprising:
    providing, by a processor of a computing device, first input data to a first neural network to generate first output data indicating that the first input data is classified in a first cluster of a plurality of clusters, wherein the first input data includes at least one of a continuous feature or a categorical feature;
    generating second input data, each input entry of the second input data including first features corresponding to the first input data and second features, each one of the second features indicating a respective one of the plurality of clusters;
    providing the second input data to at least one second neural network to generate second output data, wherein the at least one second neural network includes one or more encoding layers configured to dimensionally reduce the first features to a latent space and one or more decoding layers configured to generate a reconstruction of the first features based on sampled data from the latent space;
    providing third input data to a third neural network to generate third output data, the third output data including first mean values and first variance values for each feature in the latent space, wherein the one or more encoding layers are further configured to generate second mean values and second variance values for each feature in the latent space;
    determining an aggregate loss corresponding to the second output data, wherein determining the aggregate loss comprises at least one of evaluating a first loss function with respect to the continuous feature or evaluating a second loss function with respect to the categorical feature; and
    based on the aggregate loss, adjusting at least one parameter associated with the first neural network, at least one parameter associated with the at least one second neural network, at least one parameter associated with the third neural network, or a combination thereof, to train multiple neural networks to perform anomaly detection, the multiple neural networks including the first neural network, the at least one second neural network, and the third neural network.

2. The method of claim 1, further comprising adjusting the at least one parameter associated with the third neural network based on the aggregate loss.

3. The method of claim 1, wherein the second features comprise a one-hot encoding.

4. The method of claim 1, wherein each of the plurality of clusters is associated with a respective Gaussian distribution.

5. The method of claim 1, wherein the first output data includes a plurality of numerical values corresponding to the plurality of clusters, each numerical value of the plurality of numerical values corresponding to a respective cluster of the plurality of clusters, and wherein the numerical value corresponding to the first cluster is a highest of the plurality of numerical values.

6. The method of claim 1, wherein the first loss function corresponds to a Gaussian reconstruction loss.

7. The method of claim 1, wherein the second loss function corresponds to a Bernoulli loss.

8. The method of claim 1, wherein the aggregate loss is based on a per-feature reconstruction loss, a per-cluster distance, and a deviation of a uniform distribution from the first output data.

9. The method of claim 8, wherein the per-feature reconstruction loss and the per-cluster distance are weighted based on cluster probabilities included in the first output data.

10. The method of claim 1, wherein an input data set that includes the first input data has N input features, and further comprising performing principal component analysis (PCA) on the input data set to determine a subset of P principal components that is sufficient to represent the input data set while maintaining at least a threshold variance.

11. The method of claim 10, further comprising determining a number of clusters K based on performing a hierarchical density-based spatial clustering of applications with noise (HDBSCAN) algorithm on the P principal components.

12. The method of claim 11, further comprising determining a topology of the first neural network, a topology of the at least one second neural network, and a topology of the third neural network based on values of N, P, and K.

13. The method of claim 1, wherein at least a portion of the first neural network has a same topology as a corresponding portion of the second neural network.

14. An apparatus comprising:
    a processor; and
    a memory storing instructions executable by the processor to perform operations to generate multiple neural networks that are configured to perform anomaly detection, the operations comprising:
        providing first input data to a first neural network to generate first output data indicating that the first input data is classified in a first cluster of a plurality of clusters, wherein the first input data includes at least one of a continuous feature or a categorical feature;
        generating second input data, each input entry of the second input data including first features corresponding to the first input data and second features, each one of the second features indicating a respective one of the plurality of clusters;
        providing the second input data to at least one second neural network to generate second output data, wherein the at least one second neural network includes one or more encoding layers configured to dimensionally reduce the first features to a latent space and one or more decoding layers configured to generate a reconstruction of the first features based on sampled data from the latent space;
        providing third input data to a third neural network to generate third output data, the third output data including first mean values and first variance values for each feature in the latent space, wherein the one or more encoding layers are further configured to generate second mean values and second variance values for each feature in the latent space;

determining an aggregate loss corresponding to the second output data, wherein determining the aggregate loss comprises at least one of evaluating a first loss function with respect to the continuous feature or evaluating a second loss function with respect to the categorical feature; and based on the aggregate loss, adjusting at least one parameter associated with the first neural network, at least one parameter associated with the at least one second neural network, at least one parameter associated with the third neural network, or a combination thereof, to train multiple neural networks to perform anomaly detection, the multiple neural networks including the first neural network, the at least one second neural network, and the third neural network.

15. The apparatus of claim 14, wherein the first loss function corresponds to a Gaussian reconstruction loss, and wherein the second loss function corresponds to a Bernoulli loss.

16. The apparatus of claim 14, wherein the aggregate loss is based on a per-feature reconstruction loss, a per-cluster distance, and a deviation of a uniform distribution from the first output data, and wherein the per-feature reconstruction loss and the per-cluster distance are weighted based on cluster probabilities included in the first output data.

17. A computer-readable storage device storing instructions that, when executed, cause a processor to perform operations comprising:

receiving a data sample that includes at least one of a continuous feature or a categorical feature, wherein the data sample comprises a measurement from a sensor coupled to a device;

providing the data sample to a first neural network to generate first output data indicating a cluster identifier (ID) for the data sample;

providing input data based on the data sample to at least one second neural network corresponding to a variational auto encoder (VAE) associated with a latent space;

providing second input data to a third neural network to determine first mean values and first variance values that represent a mapping for the cluster ID to a region in the latent space;

determining an anomaly likelihood for the data sample based on reconstruction loss associated with the VAE, the first mean values, the first variance values, and second mean values generated at the VAE, the anomaly likelihood indicating a likelihood of an anomaly associated with the device;

outputting the cluster ID and the anomaly likelihood; and automatically performing at least one operation based on the cluster ID, the anomaly likelihood, or both.

18. The computer-readable storage device of claim 17, wherein the operations further comprise automatically generating at least one notification based on the cluster ID, the anomaly likelihood, or both.

19. The computer-readable storage device of claim 17, wherein the at least one operation includes triggering an operational alarm of the device, performing automatic parts shutdown of the device, scheduling a repair operation of the device, or a combination thereof.

20. The computer-readable storage device of claim 17, wherein the operations further comprise, based on a determined aggregate loss, adjusting at least one parameter associated with the first neural network, at least one parameter associated with the at least one second neural network, and at least one parameter associated with the third neural network.

* * * * *